United States Patent
Agarwal et al.

(10) Patent No.: US 9,614,920 B1
(45) Date of Patent: Apr. 4, 2017

(54) CONTEXT BASED GROUP SUGGESTION AND CREATION

(71) Applicant: Google Inc., Mountain View, CA (US)

(72) Inventors: Ayush Agarwal, Palo Alto, CA (US); Francis Ma, Mountain View, CA (US); Seth Sternberg, San Francisco, CA (US)

(73) Assignee: Google Inc., Mountain View, CA (US)

(*) Notice: Subject to any disclaimer, the term of this patent is extended or adjusted under 35 U.S.C. 154(b) by 454 days.

(21) Appl. No.: 14/218,811

(22) Filed: Mar. 18, 2014

Related U.S. Application Data (60) Provisional application No. 61/911,981, filed on Dec. 4, 2013.

(51) Int. Cl.
*G06F 15/16* (2006.01)
*H04L 29/08* (2006.01)

(52) U.S. Cl.
CPC .................. *H04L 67/22* (2013.01)

(58) Field of Classification Search
CPC ........... G06F 17/30867; G06F 17/3053; G06F 17/30528; G06F 17/30256
USPC ....................................................... 709/204
See application file for complete search history.

(56) References Cited

U.S. PATENT DOCUMENTS

| | | | |
|---|---|---|---|
| 7,260,837 B2 | 8/2007 | Abraham et al. | |
| 7,603,382 B2 | 10/2009 | Halt, Jr. | |
| 7,716,140 B1 | 5/2010 | Nielsen et al. | |
| 8,554,875 B1 | 10/2013 | Alfaro et al. | |
| 8,584,051 B1 | 11/2013 | Alfaro et al. | |
| 8,589,808 B1 | 11/2013 | Alfaro et al. | |
| 8,631,119 B2 | 1/2014 | Malkin et al. | |
| 8,676,937 B2 | 3/2014 | Rapaport et al. | |
| 8,782,022 B2 | 7/2014 | Jana et al. | |
| 8,812,419 B1 | 8/2014 | Teller et al. | |
| 8,930,820 B1 | 1/2015 | Elwell et al. | |
| 9,288,275 B2 | 3/2016 | Jain et al. | |
| 2005/0114759 A1 | 5/2005 | Williams et al. | |
| 2007/0255807 A1 | 11/2007 | Hayashi et al. | |
| 2007/0255831 A1 | 11/2007 | Hayashi et al. | |
| 2008/0235349 A1 | 9/2008 | Caspi et al. | |
| 2009/0164559 A1 | 6/2009 | Johnson et al. | |
| 2009/0228486 A1 | 9/2009 | Kuehr-Mclaren et al. | |
| 2010/0042684 A1 | 2/2010 | Broms et al. | |
| 2010/0083139 A1 | 4/2010 | Dawson et al. | |
| 2010/0161720 A1 | 6/2010 | Colligan et al. | |
| 2010/0251177 A1 | 9/2010 | Geppert et al. | |

(Continued)

*Primary Examiner* — Tu Nguyen
(74) *Attorney, Agent, or Firm* — Patent Law Works LLP (57) ABSTRACT

A system and method for providing a suggestion to a first user about adding a second user to a social group of the first user based at least in part on the context of an interaction between the first user and the second user. A connection application receives first user and second user activity on the third-party website responsive to authenticating the first user and the second user on the third-party website. The connection application identifies an interaction between the first user and the second user on the third-party website and determines the context for the interaction between the first user and the second user on the third-party website. The connection application identifies a group that the first user created on the social network based on the identified context and provides a suggestion to the first user that the first user add the second user to the group.

20 Claims, 5 Drawing Sheets

(56) References Cited

U.S. PATENT DOCUMENTS

| | | | |
|---|---|---|---|
| 2010/0281104 A1 | 11/2010 | Tomkins et al. | |
| 2010/0293105 A1 | 11/2010 | Blinn et al. | |
| 2011/0010305 A1 | 1/2011 | Aleong et al. | |
| 2011/0047013 A1 | 2/2011 | McKenzie, III | |
| 2011/0138028 A1 | 6/2011 | Katz et al. | |
| 2011/0161202 A1 | 6/2011 | Arunachalan | |
| 2011/0161791 A1 | 6/2011 | Travis et al. | |
| 2011/0238815 A1 | 9/2011 | Malkin et al. | |
| 2011/0289433 A1 | 11/2011 | Whalin et al. | |
| 2011/0314115 A1 | 12/2011 | Nagaraj | |
| 2012/0158843 A1 | 6/2012 | Angani et al. | |
| 2012/0179981 A1 | 7/2012 | Whalin et al. | |
| 2012/0278262 A1 | 11/2012 | Morgenstern et al. | |
| 2013/0006879 A1* | 1/2013 | Ramanathan | G06Q 50/01 705/319 |
| 2013/0073636 A1 | 3/2013 | Zhu et al. | |
| 2013/0097246 A1 | 4/2013 | Zifroni et al. | |
| 2013/0184031 A1 | 7/2013 | Pollington et al. | |
| 2013/0325755 A1 | 12/2013 | Arquette et al. | |
| 2014/0143347 A1 | 5/2014 | Murarka et al. | |
| 2014/0214824 A1* | 7/2014 | Mai | G06Q 50/01 707/731 |
| 2014/0344358 A1 | 11/2014 | Liu et al. | |
| 2015/0033305 A1 | 1/2015 | Shear et al. | |
| 2015/0046542 A1 | 2/2015 | Yamamoto et al. | |
| 2016/0007912 A1 | 1/2016 | Hu et al. | |

\* cited by examiner

CONTEXT BASED GROUP SUGGESTION AND CREATION

CROSS REFERENCE TO RELATED APPLICATIONS

The present application claims priority, under 35 U.S.C. §119, of U.S. Provisional Patent Application No. 61/911,981, filed Dec. 4, 2013 and entitled "Context Based Group Suggestion and Creation," which is incorporated by reference in its entirety.

BACKGROUND

The specification relates to generating a suggestion. In particular, the specification relates to providing a suggestion to a first user about adding a second user to a social group of the first user based at least in part on the context of an interaction between the first user and the second user.

Users frequently generate profiles on a variety of websites using different usernames. When the usernames are not intuitive variations of a user's legal name, it can be difficult for friends to identify those users. In addition, users can cultivate specific interests on certain websites that might be difficult to detect. Sometimes a user's profile page on a social network will list usernames on other websites. However, this is not always the case and it presumes that other users are willing to go to the trouble of researching the user.

SUMMARY

In some embodiments, the specification describes a computer-implemented method comprising: registering a first user and a second user by providing the first user and the second user with login credentials; responsive to the first party and the second user authenticating on a third-party website using their login credentials, receiving first user and second user activity on the third-party website; identifying an interaction between the first user and the second user on the third-party website; determining a context for the interaction between the first user and the second user on the third-party website; identifying a group that the first user created on the social network based on the context; and providing a suggestion that the first user add the second user to the group.

In some embodiments, the specification describes a system comprising one or more processors and a memory storing instructions that when executed by the one or more processors cause the system to: register a first user and a second user by providing the first user and the second user with login credentials; responsive to the first party and the second user authenticating on a third-party website using their login credentials, receive first user and second user activity on the third-party website; identify an interaction between the first user and the second user on the third-party website; determine a context for the interaction between the first user and the second user on the third-party website; identify a group that the first user created on the social network based on the context; and provide a suggestion that the first user add the second user to the group.

In some embodiments, the operations further include receiving acceptance of the suggestion that the first user add the second user to the group; determining whether the second user has a second group with the context; and responsive to the second user having a second group with the context, adding the first user to the second group. In some embodiments, the group is a second group and the operations further include identifying a first group that the first user added the second user to on the social network. The operations further include determining whether the first user and second user satisfied a threshold number of interactions on the third-party website.

In some embodiments, the features further include the social network including a first social network and the third-party website including a second social network. In some embodiments, the features further include the context for the interaction on the third-party website being determined from a subject of the third-party website. In some embodiments, the features further include the suggestion being sent via the social network and the second user is automatically added to the group. In some embodiments, the features further include the interaction on the third-party website being at least one of an indication of approval of an action associated with the first user, a comment from the second user on an action performed by the first user and a reciprocal electronic message between the first and second users.

The specification describes a connection application providing a suggestion to a first user about adding a second user to a social group of the first user based at least in part on the context of an interaction between the first user and the second user, which advantageously optimizes continued social interaction between the users of a social network and allows for optimized discovery of common interests. The connection application determines a context associated with an interaction between the two users and provides a suggestion to the first user to add the second user to a social group of the first user based on the context of that interaction.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

The specification describes a connection application for providing a suggestion to a first user about adding a second user to a social group of the first user based at least in part on the context of an interaction between the first user and the second user.

In some embodiments, the connection application registers a first user and a second user on a third-party website by providing the first user and the second user with login credentials. The connection application receives first user and second user activity on the third-party website responsive to authenticating the first user and the second user on the third-party website. The connection application identifies an interaction between the first user and the second user on the third-party website and determines the context for the interaction between the first user and the second user on the third-party website. The connection application identifies a group that the first user created on the social network based on the identified context. The connection application provides a suggestion to the first user that the first user add the second user to the group.

In other embodiments, the connection application registers a first user and a second user by providing the first user and the second user with login credentials from a first social network. The connection application identifies a first group that the first user added the second user to on the first social network. The connection application 103 receives first user and second user activity on a second social network responsive to authenticating the first user and the second user on the second social network using the login credentials. The connection application 103 identifies an interaction between the first user and the second user on the second social network and determines the context for the interaction between the first user and the second user on the second social network. The connection application identifies a second group that the first user created on the first social network based on the identified context. The connection application provides a suggestion to the first user that the first user add the second user to the group.

Figure 1:
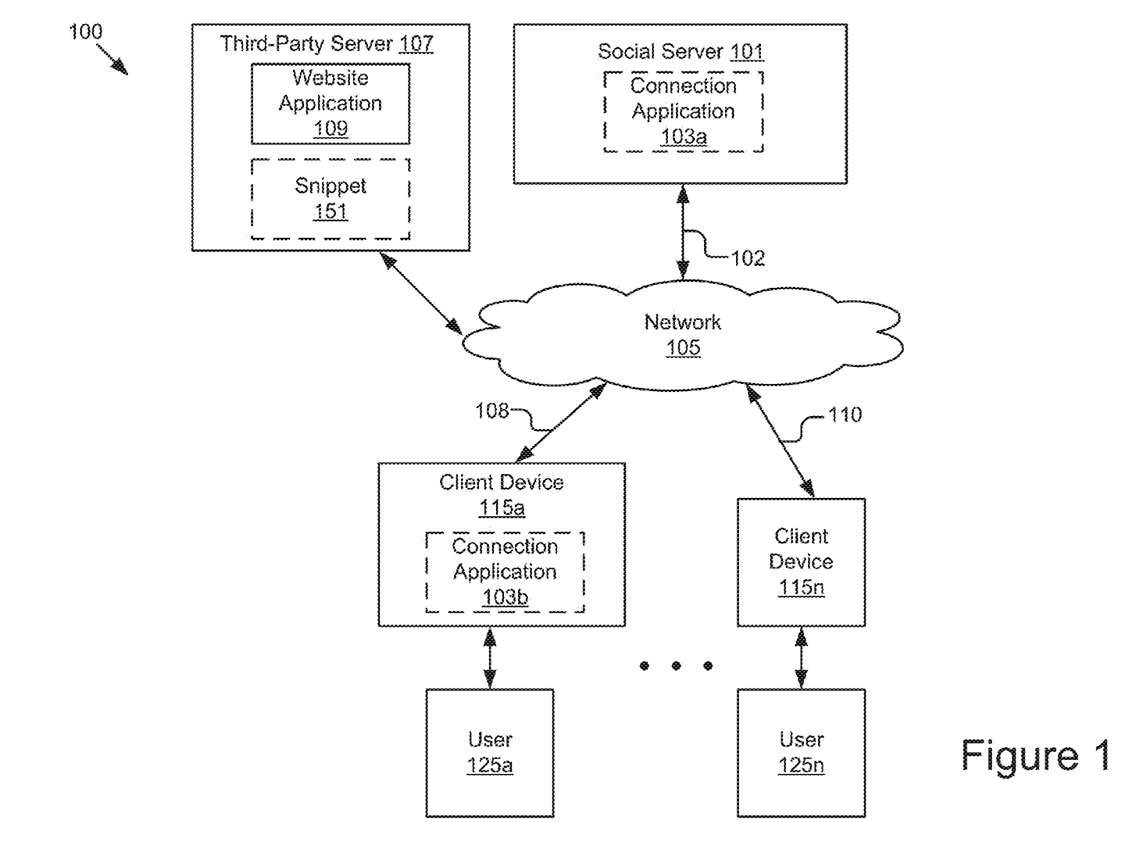
FIG. 1 is a block diagram illustrating an example of a system for providing a group suggestion to a user of a social network.

FIG. 1 illustrates a block diagram of a system 100 for providing a suggestion to a first user about adding a second user to a social group of the first user based at least in part on the context of an interaction between the first user and the second user. This suggestion may also be referred to as a group suggestion in some areas of this disclosure. The group suggestion is a suggestion to a first user about adding a second user to a social group of the first user and is based on context of an interaction between the users. The illustrated description of the system 100 includes user devices 115a . . . 115n that are accessed by users 125a . . . 125n, a social network server 101, and a third-party server 107. In the illustrated embodiment, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 may be a conventional type network, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of a telecommunications network for sending data in a variety of different communication protocols. In some other embodiments, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, persons with ordinary skill in the art will recognize that any number of networks may be coupled to the above mentioned entities.

In some embodiments, a connection application 103a may be operable on the social network server 101, which is coupled to the network 105 via signal line 102. The social network server 101 can be a hardware server that includes a processor, a memory and network communication capabilities. The social network server 101 sends and receives data to and from one or more of the user devices 115a, 115n and the third-party server 107 via the network 105. The social network server 101 also includes a social network application (not pictured) that can be part of the connection application 103 or a standalone application. A social network can be any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph. In some examples, the social graph can reflect a mapping of these users and how they are related. Furthermore, it should be understood that the social network server 101 may be representative of one social network and that there may be multiple social networks coupled to the network 105, each having its own server, application and social graph. For example, a first social network may be more directed to business networking, a second may be more directed to or centered on academics, a third may be more directed to local business, a fourth is directed to dating and others are of general interest or a specific focus.

In some embodiments, a snippet 151 can be stored on a third-party server 107, which is communicatively connected to the network 105 via signal line 106. The third-party server 107 includes an application for generating a third-party website (not shown). The snippet 151 can be code or routines configured to enable the software included in the third-party server 107 to communicate with the connection application 103 so that the software can use the service provided by the connection application 103. For example, the snippet 151 communicates with the connection application 103 to generate an "add this user" icon or button for providing a suggestion to a first user to add a second user to a group of the first user. The third-party website can be catering to specific services, such as online multi-player games, fitness, calorie counter, reviews, traveling, etc. The users visiting the third-party website (or users authenticated through the social network server 101) can send messages to their connections (i.e. user recipients) within their respective social networks about at least one aspect of the service offered by the third-party website hosted by the third-party website. For example, an authenticated user sends messages, such as invitations, turn-based notifications, challenge notification, etc., through a turn-based multiplayer game website to recipients on the social network with whom the sender is connected. In some embodiments, the snippet 151 includes HyperText Markup Language code ("HTML code") that can be configured to communicate with the connection application 103 to exchange data, information and/or commands. In some other embodiments, the snippet 151 includes code from a group of C, C++, Java, CSS and PHP. Furthermore, while only one snippet 151 is shown in the third-party server 107, the third-party server 107 could include one or more snippets 151. Similarly while only one third-party server 107 is shown, the system 100 can include one or more third-party servers 107.

The user devices 115a, 115n in FIG. 1 are used by way of example. Although only two user devices 115 are illustrated, persons of ordinary skill in the art will recognize that any numbers of user devices 115 are available to any number of users 125. The users 125a, 125n interact with the user devices 115a, 115n. In some embodiments, the connection application 103b may be stored on the user device 115a which is connected to the network 105 via signal line 108. In some other embodiments, the connection application 103 can be split into some components that are stored on the user device 115a and some components that are stored on the social network server 101. For example, the connection application 103a on the social network can store user information and receive messages and the connection application 103b on the user device 115a is a thin-client application for displaying the messages.

The user device 115 can be any computing device that includes a memory and a processor. For example, the user device 115 can be a laptop computer, a desktop computer, a tablet computer, a mobile telephone, a personal digital assistant, a mobile email device, a portable game player, a portable music player, a television with one or more processors embedded therein or coupled thereto, a device that is worn by the user (e.g., a smart watch, part of a clip, or part of jewelry) or any other electronic device capable of accessing the network 105, etc.

The connection application 103 can be software including routines for providing a suggestion to a first user about adding a second user to a social group of the first user based at least in part on the context of an interaction between the first user and the second user. In some embodiments, the connection application 103 can be implemented using hardware including a field-programmable gate array (FPGA) or an application-specific integrated circuit (ASIC). In other embodiments, the connection application 103 can be implemented using a combination of hardware and software.

In some embodiments, the connection application 103 registers a first user and a second user on a third-party website by providing the first user and the second user with login credentials. The connection application 103 receives first user and second user activity on the third-party website responsive to authenticating the first user and the second user on the third-party website. The connection application 103 identifies an interaction between the first user and the second user on the third-party website and determines the context for the interaction between the first user and the second user on the third-party website. The connection application 103 identifies a group that the first user created on the social network based on the identified context. The connection application 103 provides a suggestion to the first user that the first user add the second user to the group.

In other embodiments, the connection application 103 registers a first user and a second user by providing the first user and the second user with login credentials from a first social network. The connection application 103 identifies a first group that the first user added the second user to on the first social network. The connection application 103 receives first user and second user activity on a second social network responsive to authenticating the first user and the second user on the second social network using the login credentials. The connection application 103 identifies an interaction between the first user and the second user on the second social network and determines the context for the interaction between the first user and the second user on the second social network. The connection application 103 identifies a second group that the first user created on the first social network based on the identified context. The connection application 103 provides a suggestion to the first user that the first user add the second user to the group. The connection application 103 is described in further detail below with reference to FIG. 2.

Figure 2:
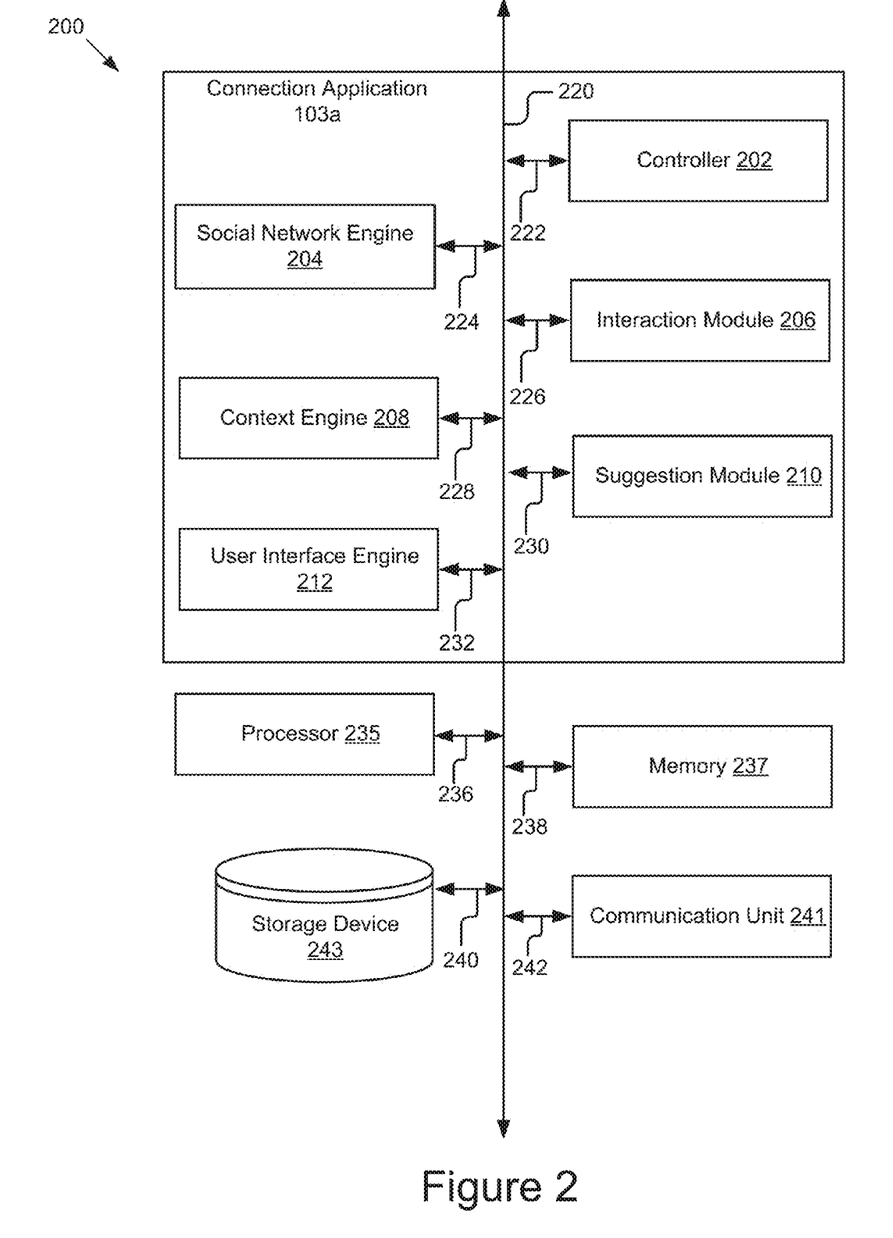
FIG. 2 is a block diagram illustrating an example connection application.

Referring now to FIG. 2, a block diagram of a computing device 200 is illustrated that includes a processor 235, a memory 237, a communication unit 241 and a storage device 243 according to some examples. The components of the computing device 200 are communicatively coupled by a bus 220. The computing device 200 can be a social network server 101 or a user device 115.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media for example a disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115 and the social network server 101 depending upon where the connection application 103 is stored. The communication unit 241 is coupled to the bus 220 via signal line 242. In some embodiments, the communication unit 241 includes a port for direct physical connection to the network 105 or to another communication channel. For example, the communication unit 241 includes a USB, SD, CAT-5 or similar port for wired communication with the user device 115. In some other embodiments, the communication unit 241 includes a wireless transceiver for exchanging data with the user device 115 or any other communication channel using one or more wireless communication methods, such as IEEE 802.11, IEEE 802.16, BLUETOOTH® or another suitable wireless communication method.

In some embodiments, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In some other embodiments, the communication unit 241 includes a wired port and a wireless transceiver. The communication unit 241 also provides other conventional connections to the network for distribution of files and/or media objects using standard network protocols such as TCP/IP, HTTP, HTTPS and SMTP as will be understood to those skilled in the art.

The storage device 243 can be a non-transitory memory that temporarily stores data used by the connection application 103, for example, a cache. The storage device 243 may be a dynamic random access memory (DRAM) device, a static random access memory (SRAM) device, flash memory or some other memory device known in the art. In some embodiments, the storage device 243 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In the illustrated embodiment, the storage device 243 is communicatively coupled by the bus 220 for communication with the other components of the computing device 200 via signal line 240. Although only one storage device is shown in FIG. 2, multiple storage devices may be included. In another embodiment, the storage device 243 may not be included in the computing device 200 and can be communicatively coupled to the computing device 200 via the network 105.

In some embodiments, the storage device 243 stores interactions of users of the social network. In some embodiments, the storage device 243 stores interactions of users of third-party websites. In some embodiments, the storage device 243 stores the message sent by a sender to one or more user recipients on the social network. For example, the request can be a game invitation, a review, a status update, etc. In some embodiments, the storage device 243 stores data including daily habits, routines and activities determined for the one or more users on the social network. In some embodiments, the storage device 243 stores the data including groups of context and real time context associated with the one or more users. The data stored in the storage device 243 is described below in more detail. In some embodiments, the storage device 243 may store other data for providing the functionality described herein.

In some embodiments, the connection application 103 includes a controller 202, a social network engine 204, an interaction module 206, a context engine 208, a suggestion module 210 and a user interface engine 212.

The controller 202 can be software including routines for receiving data via the communication unit 241, routing the data to the appropriate engine or module and transmitting responses from the engine or module to the communication unit 241 for transmission to the user device 115 or the social network server 101. In some embodiments, the controller 202 can be a set of instructions executable by the processor 235 to provide the functionality described below for handling communications between the connection application 103 and other components of the computing device 200. In some other embodiments, the controller 202 can be stored in the memory 237 of the computing device 200 and can be accessible and executable by the processor 235. In either of the embodiments, the controller 202 may be adapted for cooperation and communication with the processor 235 and other components of the computing device 200 via signal line 222.

In some embodiments, the controller 202 identifies the type of data being received and transmits the data to the appropriate engine or module of the connection application 103. For example, the controller 202 receives information from the social network server 101 for rendering a user interface of the social network and transmits the information to the user interface engine 212. In some other embodiments, the controller 202 receives user inputs and user actions submitted by the user 125 from the user device 115. The controller 202 sends the user actions and the user inputs to the appropriate engine or module of the connection application 103.

In some embodiments, the controller 202 receives information from other components of the connection application 103 and transmits the information to the appropriate component in the system 100 via the communication unit 241. For example, the controller 202 receives graphical data for generating a user interface displaying a message from the user interface engine 212. The controller 202 transmits the graphical data associated with displaying the message to a display device (not shown) that is part of the user device 115. In another example, the controller 202 receives information including context data associated with an interaction between users from the context engine 208. The controller 202 transmits the information including context data to the suggestion module 210 for providing a group suggestion to the user.

In some embodiments, the controller 202 receives data from components of the connection application 103 and stores the data in the storage device 243. For example, the controller 202 receives a data including context associated interactions between users from the context engine 208 and stores them in the storage device 243. In some other embodiments, the controller 202 retrieves data from the storage device 243 and sends the data to other components of the connection application 103. For example, the controller 202 retrieves one or more messages from the storage device 243 and transmits them to the suggestion module 210 for providing group suggestions to users.

The social network engine 204 can be software including routines for generating and managing a social network. In some embodiments, the social network engine 204 can be a set of instructions executable by the processor 235 to provide the functionality described below for generating and managing a social network. In some other embodiments, the social network engine 204 can be stored in the memory 237 of the computing device 200 and can be accessible and executable by the processor 235. In either of the embodiments, the social network engine 204 can be adapted for cooperation and communication with the processor 235, the controller 202, the user interface engine 212 and other components of the connection application 103 via signal line 224.

A social network can be a type of social structure where the relationships between the users 125 are included in a social graph. In some embodiments, the social graph includes a social affinity between users. For example, when a first user follows a second user, they have a first-degree relationship. When the second user follows a third user that the first user does not follow, the first user has a second-degree relationship with the third user. The lower the degree of separation between users, the more they share social affinity. In some embodiments, social affinity is also a measure of how many people are connected between users. For example, two users that are associated with the same five people could have a higher affinity than two users that are both associated with only one person.

In some embodiments users are connected in the social network by being friends. For example, users A and B can have reciprocal friendships with each other. In other embodiments, the relationships can be single directional, for example, when user A chooses to followed updates posted by user B. If user B chooses to follow user A, the relationship can be described as bi-directional or multi-directional. User B can choose to share updates with the public, which results in user A being able to view the update, or user B can share the updates with only people that user B follows. In some embodiments these relationships can be divided into groups on the social network based on context. Some areas of this disclosure refer to such groups as social groups. The groups can be used by the user to share information or send messages within the social network that is directed to that group. For example, user A can create an acquaintance group of users that user A wants to view updates from, but that user A does not know very well. In another example, user A can create a group of students taking the same class, e.g. a study group or people helpful for networking. In such examples, user A can use the created group to share information within or send messages directly to the members of the group.

The social network engine 204 manages the social network by handling registration of users, publication of content (e.g. posts, comments, photos, links, check-ins, etc.), hosting multi-user communication sessions, managing of groups, managing different sharing levels, updating the social graph, etc. The social network engine 204 registers a user by receiving information such as a username and password and generates a user profile that is associated with the user and stored as part of the social graph. In one embodiment, the user profile includes additional information about the user including interests (e.g. soccer, reading, food, subscriptions, gaming, etc.), activities (e.g. search history, indications of approval, posts, comments, multi-player online gaming, etc.), work (e.g., doctor, engineer, lawyer, research scientist, etc.), education (e.g., engineering, medicine, law, business, etc.) and demographics (e.g. age, ethnicity, location, etc.), etc. The social network engine 204 stores the user profile in the storage device 243.

In some embodiments, the social network engine 204 receives a request including login information for authentication. For example, the social network engine 204 receives a login request including a username and password from a user for logging into a social network. The social network engine 204 identifies the requesting user based on the login information associated with the login. In some other embodiments, the social network engine 204 communicates with the snippet 151 stored in the third-party server 107 and authenticates the user logging into the third-party website using the same credentials. In some embodiments, the social network engine 204 receives Application Programming Interface (API) requests generated by the snippet 151 stored on the third-party server 107. The API requests retrieve information about the user (for e.g., profile photo and name) and connect the user with his or her social connections on the social network. In some other embodiments, the social network engine 204 receives a message from the snippet 151 on the third-party server 107. The message is sent to specific recipients on the social network from a sender logged into the third-party website. For example, a sender is connected to the specific recipients on the social network and sends an in-game message from a turn-based multiplayer website. The social network engine 204 transmits instructions to the user interface engine 212 to generate a user interface that includes information associated with the message including a picture or a thumbnail, a title and a body of the message.

In some embodiments, the social network engine 204 transmits messages received from a sender to the context engine 208. In some other embodiments, the social network engine 204 stores the messages in the storage device 243.

The interaction module 206 can be software including routines for identifying interactions between one or more users of a social network. In some embodiments, the interaction module 206 can be a set of instructions executable by the processor 235 to provide the functionality described below for identifying interactions between one or more users of a social network. In some other embodiments, the interaction module 206 can be stored in the memory 237 of the computing device 200 and can be accessible and executable by the processor 235. In either of the embodiments, the interaction module 206 can be adapted for cooperation and communication with the processor 235, the social network engine 204, the channel suggestion module 210 and other components of the connection application 103 via signal line 226.

In some embodiments, the interaction module 206 identifies an interaction between two or more users of a social network. In some embodiments, the interaction module 206 identifies an interaction between two or more users on a third-party website. In some embodiments, the interaction module 206 identifies an interaction between a first user and a second user on a third-party website. In some embodiments, the first user and the second user are registered on or belong to a third-party website. The interaction module 206 identifies an interaction between the first user and the second user on the third-party website. The interaction can be a message sent from one user to another. The interaction can also be exchange of information from one user to another. The interaction can also be a communication from one user to another. In some embodiments, the interaction is a direct interaction. In other embodiments, the interaction is an indirect interaction. In some embodiments, the interaction is an online social interaction. For example, user A may send user B a message through electronic communication, such as e-mail. The interaction module 206 identifies that message exchange as an interaction between user A and user B. In some embodiments, the interactions identified by the interaction module 206 are stored in the storage device 243. In some embodiments, the interactions identified by the interaction module 206 are sent to the context engine 208 for further processing.

In some embodiments, the interaction module 206 identifies an interaction between a first user of a first social network and a second user of the first social network on a second social network. For example, user A and user B belongs to social network A. User A and user B perform an interaction with each other on a second social network. For example, the second social network can be a website or social network for sharing commentary about various stores, restaurants or services. In such example, user A posts a comment about a particular restaurant and user B comments on user A's post. This exchange between user A and user B can be identified by the interaction module 206 as an interaction between user A and user B. In some embodiments, the interactions identified by the interaction module 206 are stored in the storage device 243. In some embodiments, the interactions identified by the interaction module 206 are sent to the context engine 208 for further processing.

The context engine 208 can be software including routines for determining context of the interaction between the one or more users of the social network. In some embodiments, the context engine 208 can be a set of instructions executable by the processor 235 to provide the functionality described below for determining context of the interaction between the one or more users of the social network. In some other embodiments, the context engine 208 can be stored in the memory 237 of the computing device 200 and can be accessible and executable by the processor 235. In either of the embodiments, the context engine 208 can be adapted for cooperation and communication with the processor 235, the social network engine 204, the suggestion module 210 and other components of the connection application 103 via signal line 228.

In some embodiments, the context engine 208 receives data including an identified interaction between two or more users and determines context relating to the identified interaction identified by the interaction module 206. In some embodiments, the context engine 208 receives data including an identified interaction between the first user and the second user and determines context relating to the identified interaction identified by the interaction module 206.

In some embodiments, the context engine 208 analyzes data and/or content in the identified interaction and determines the context of the interaction based on the analysis. For example, the context engine 208 identifies, from key words in the interaction, that the interaction related to kids. One skilled in the art will recognize that many algorithms and methods can be used in determining user context.

In some instances, the context engine 208 communicates with the social network engine 204 to identify a group created by a user in a social network that is associated with specific context. For example, based on information (e.g., content in the interaction) received from the social network engine 204, the context engine 208 identifies a "creativity for kids" community in a social network created by Bill. In some instances, the context engine 208 identifies same context for interactions associated with a first user and a second user, and identifies a group associated with the same context. The group is created by the first user in a social network. A suggestion may be made to the first user to add the second user to the identified group. Providing a suggestion based on a set of criteria will be described in detail below with reference to the suggestion module 210.

The suggestion module 210 can be software including routines for providing a suggestion to a first user about adding a second user to a social group of the first user based at least in part on the context of an interaction between the first user and the second user. In some embodiments, the suggestion module 210 can be a set of instructions executable by the processor 235 to provide the functionality described below for providing a suggestion to a first user about adding a second user to a social group of the first user based at least in part on the context of an interaction between the first user and the second user. In some other embodiments, the suggestion module 210 can be stored in the memory 237 of the computing device 200 and can be accessible and executable by the processor 235. In either of the embodiments, the suggestion module 210 can be adapted for cooperation and communication with the processor 235, the social network engine 204, interaction module 206, the context engine 208 and other components of the connection application 103 via signal line 230.

In some embodiments, the suggestion module 210 communicates with the interaction module 206 and context engine 208 to prove group suggestions to users. In some embodiments, suggestion module 210 provides a suggestion to the first user that the first user add the second user to the group. For example, the suggestion module 210 identifies that user A has created a modern art group and provides a suggestion to user A that user A add user B to the modern art group of user A. In some embodiments, the suggestion module 210 provides a suggestion to the first user that the first user add the second user to the group. For example, the context engine 208 determines that user A has created a food lovers group and, based on the determination that the context of the interaction was about food, the suggestion module provides a suggestion to user A that user A add user B to user A's food lovers group.

The user interface engine 212 can be software including routines for generating graphical data for generating group suggestions to users. In some embodiments, the user interface engine 212 can be a set of instructions executable by the processor 235 to provide the functionality described below for generating group suggestions to users. In some other embodiments, the user interface engine 212 can be stored in the memory 237 of the computing device 200 and is accessible and executable by the processor 235. In either of the embodiments, the user interface engine 212 can be adapted for cooperation and communication with the processor 235 and other components of the connection application 103 via signal line 234.

In some embodiments, the user interface engine 212 receives instructions from the social network engine 204 to generate graphical data that depicts a user interface for displaying a suggestion to a first user. The suggestion includes the user identifier of another user, a suggestion to add that user to a group of the first user and an option or link to enable to addition of the other user to the first user's group. In some other embodiments, the user interface engine 212 generates graphical data for social network content based at least in part on instructions from the social network engine 204. For example, the user interface engine 212 generates graphical data for displaying a user profile photo, name, text messages, videos, etc. The user interface engine 212 sends the graphical data to an application (e.g., a browser) in the user device 115 via the communication unit 241 causing the application to display the data in a user interface. In some embodiments, the user interface engine 212 generates graphical data to display the suggestion within the social network content.

Figure 3:
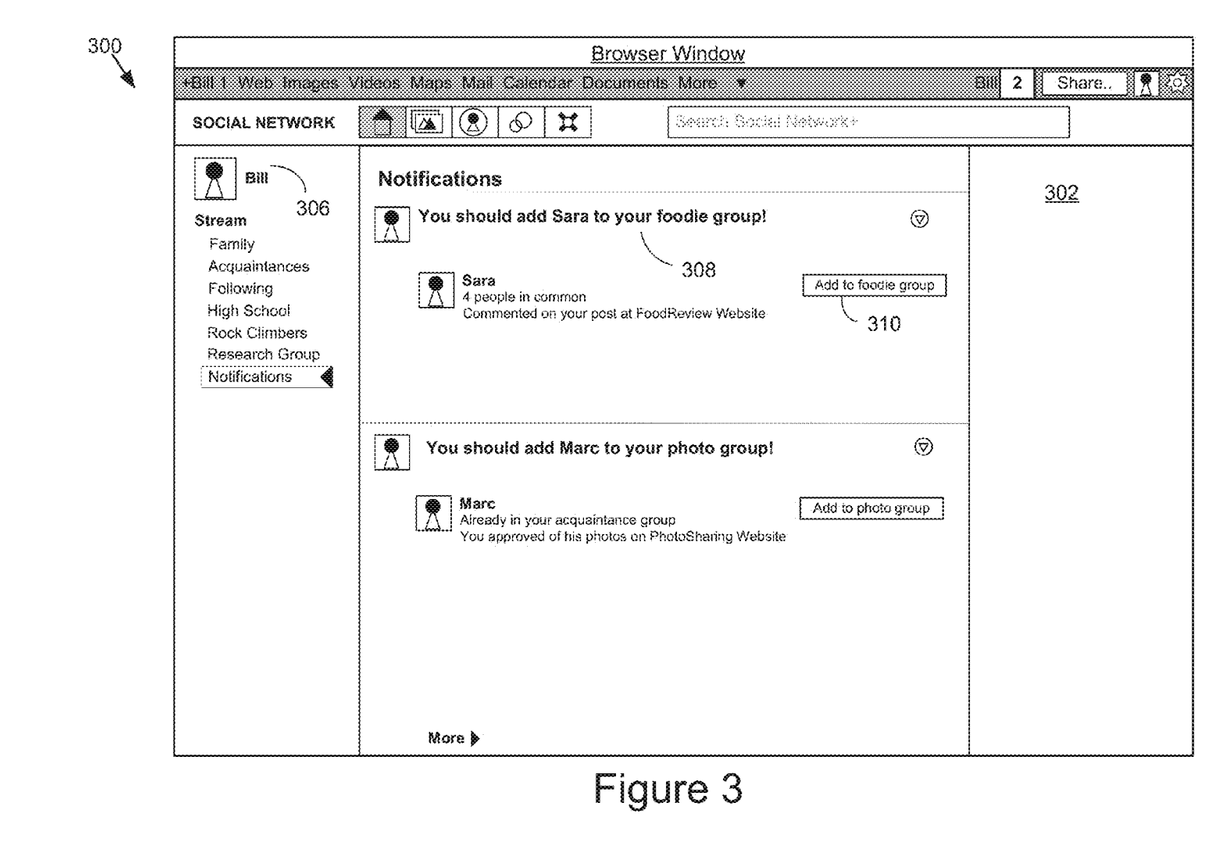
FIG. 3 is an example graphic representation of a user interface for providing a group suggestion to a user of a social network.

Turning now to FIG. 3, one example of a graphical representation of a user interface 300 for providing a suggestion to a first user about adding a second user to a social group of the first user based at least in part on the context of an interaction between the first user and the second user. The user interface 300 displays a web page 302 of a social network that the user "Bill" 306 is a member. The user interface 300 includes a suggestion 308 and option or link 310 to add user "Sara" to user a group that user "Bill" has created.

Figure 4:
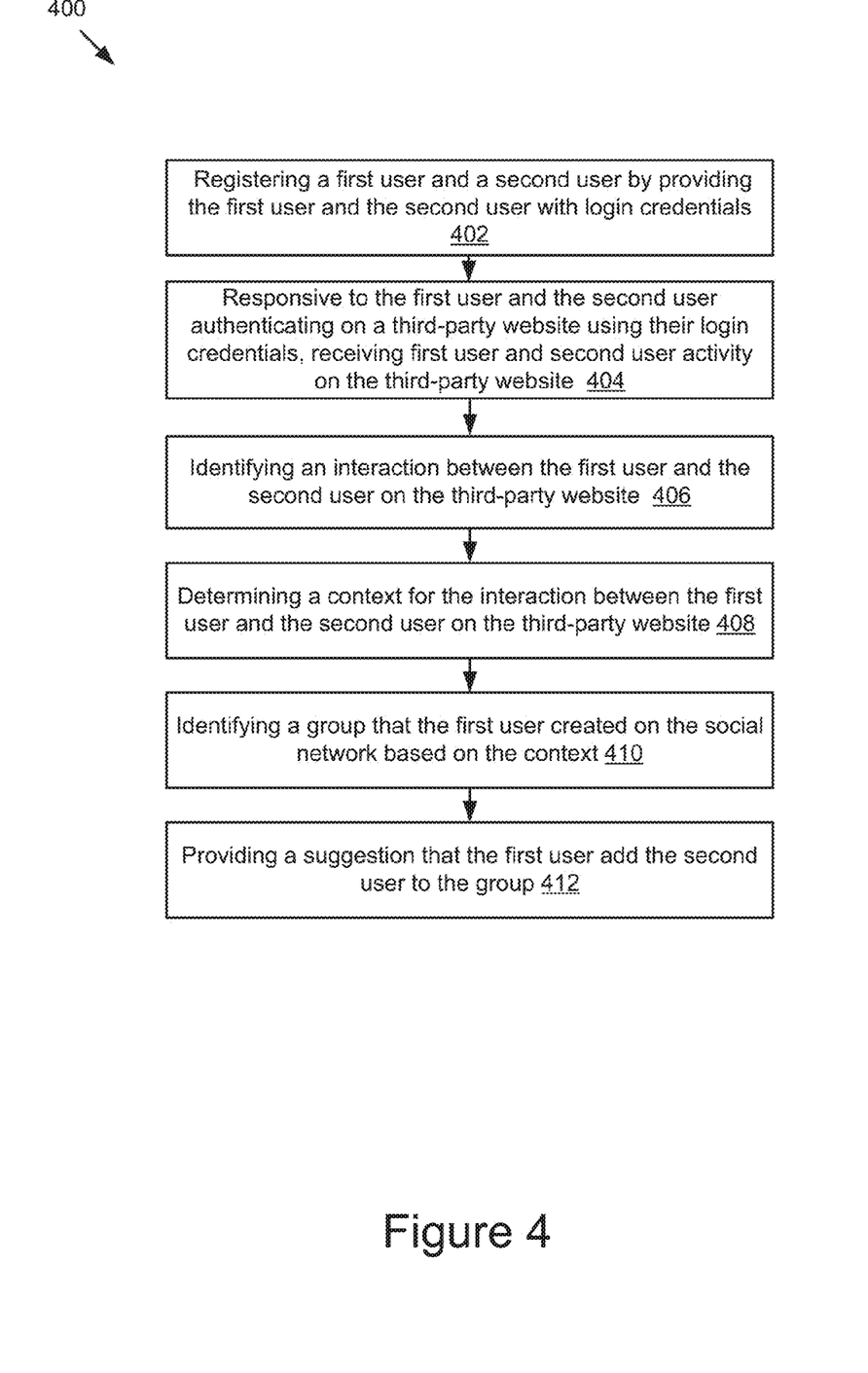
FIG. 4 is a flow diagram of an example of a method for providing a group suggestion to a user of a social network according to one embodiment.

FIG. 4 is a flow diagram of an example of a method 400 for generating a group suggestion based on context of an interaction between two or more users according to implementation. Specifically, as will be described in the following paragraphs, FIG. 4 is a flow diagram of an example of a method 400 for providing a suggestion to a first user about adding a second user to a social group of the first user based at least in part on the context of an interaction between the first user and the second user.

The connection application 103, as described above, includes a social network module 204, an interaction module 206, a context engine 208 and a suggestion module 210. In some embodiments, the social network engine 204 of the connection application 103 registers 402 a first user and a second user by providing the first user and the second user with login credentials to a third-party website. For example, user A and user B can be members of website A and log in to website A using their login credentials. The interaction module 206 of the connection application 103 receives 404 first user and second user activity on the third-party website responsive to authenticating the first user and the second user on the third-party website. For example, user A and user B can send messages or upload or exchange pictures through website A. Specifically, user A can log into website A and send a message or a picture to user B within the website A. The interaction module 206 of the connection application 103 identifies 406 an interaction between the first user and the second user on the third-party website. For example, the interaction module 206 identifies that user A has interacted with user B because user A sent a message to user B. The context engine 208 determines 408 the context of the interaction between the first user and the second user on the third-party website. For example, based on key words in the message, the context engine 208 determines that the message from user A is about modern art museums in the local area. The context engine 208 of the connection application 103 identifies 410 a group that the first user created on the social network based on the identified context and provides 412 a suggestion to the first user that the first user add the second user to the group. For example, the suggestion module 210 identifies that user A has created a modern art group and provides a suggestion to user A that user A add user B to the modern art group of user A.

Figure 5:
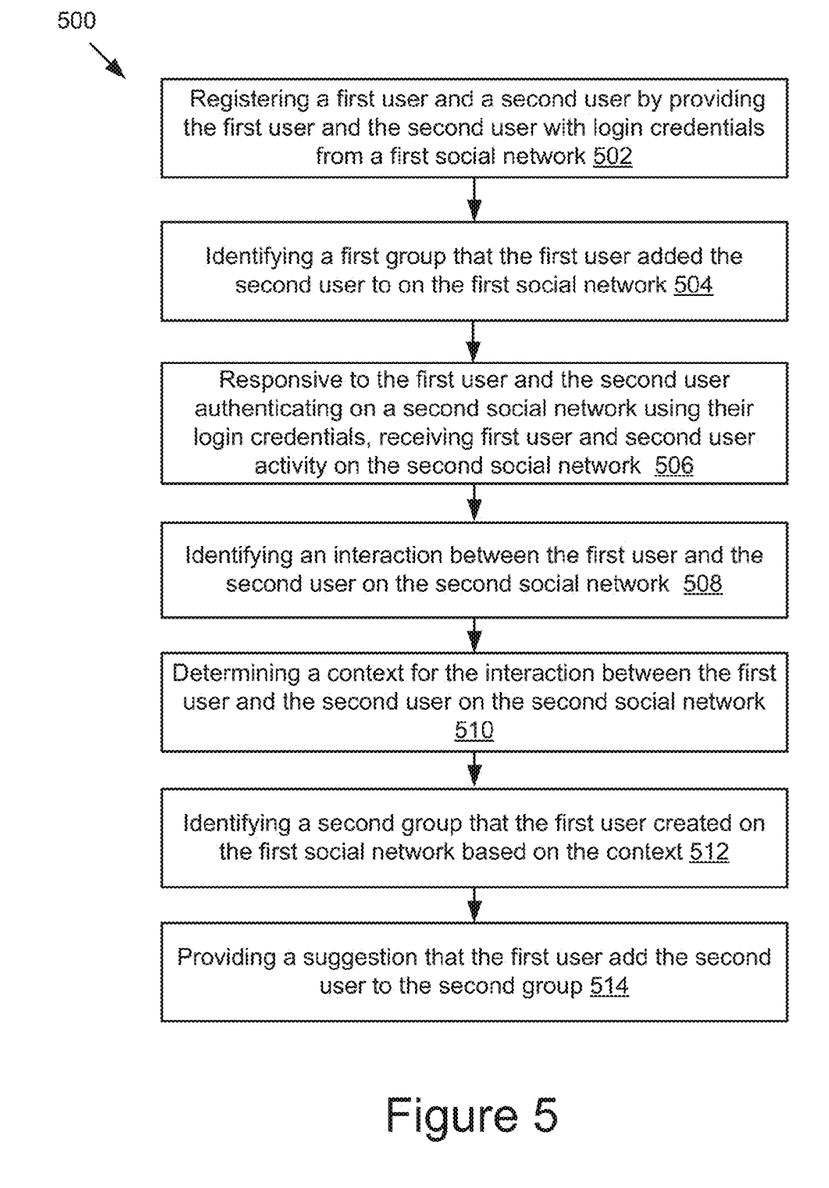
FIG. 5 is a flow diagram of another example of another method for providing a group suggestion to a user of a social network according to another embodiment.

FIG. 5 is a flow diagram of another example of another method for generating a group suggestion based on context of an interaction between two or more users according to another implementation. Specifically, as will be described in the following paragraphs, FIG. 5 is a flow diagram of an example of a method 500 for providing a suggestion to a first user about adding a second user to a social group of the first user based at least in part on the context of an interaction between the first user and the second user.

In other embodiments, the social network engine 204 of the connection application 103 registers 502 a first user and a second user on by providing the first user and the second user with login credentials from a first social network. For example, user A and user B are members of social network A and are logged into social network A with their login credentials. In some embodiments, the social network engine 204 of the connection application 103 identifies 504 a first group that the first user added the second user to on the first social network. For example, the social network engine 204 identifies that user A and user B are connected to each other in social network A and user B belongs to user A's cycling group. The interaction module 206 of the connection application 103 receives 506 first user and second user activity on a second social network responsive to authenticating the first user and the second user on the second social network using the login credentials. For example, user A logs on to a another website, for example, a website that allows users to post comments about restaurants, stores, or other services, and posts a comment about a new restaurant that just opened. The interaction module 206 also determines that user B also posted a comment on the website. Specifically, user B adds a comment to user A's post about the restaurant. The interaction module 206 of the connection application 103 identifies 508 an interaction between the first user and the second user on the second social network. For example, the interaction module 206 identifies that user B commented on user A's post and determines that user B has had an interaction with user A. The context engine 208 determines 510 the context for the interaction between the first user and the second user on the second social network. For example, based on the subject matter of the post, the context engine 208 determines that the interaction was related to food. The context engine 208 of the connection application 103 identifies 512 a second group that the first user created on the first social network based on the identified context. The suggestion module 210 provides 514 a suggestion to the first user that the first user add the second user to the group. For example, the suggestion module 210 determines that user A has created a food lovers group and, based on the determination that the context of the interaction was about food, the suggestion module 210 provides a suggestion to user A that user A add user B to user A's food lovers group.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "some embodiments" or "an instance" means that a particular feature, structure, or characteristic described in connection with the embodiment is included in at least some embodiment of the description. The appearances of the phrase "in some embodiments" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    registering, with one or more processors, a first user and a second user by providing the first user and the second user with login credentials from a first social network;
    identifying, with the one or more processors, a first group that the first user added the second user to on the first social network;
    authenticating the first user and the second user on a second social network using the login credentials based on communicating the first social network and the second social network through a snippet installed on the second social network;
    responsive to authenticating the first user and the second user on the second social network, receiving first user and second user activity on the second social network;
    identifying, with the one or more processors, an interaction between the first user and the second user on the second social network;
    determining, with the one or more processors, a context for the interaction between the first user and the second user on the second social network;
    identifying, with the one or more processors, a second group that the first user created on the first social network based on the context; and
    providing a suggestion that the first user add the second user to the second group.

2. A computer-implemented method comprising:
    registering, with one or more processors, a first user and a second user by providing the first user and the second user with login credentials from a social network;
    authenticating the first user and the second user on a third-party website using the login credentials based on communicating the social network and the third-party website through a snippet installed on the third-party website;
    responsive to authenticating the first user and the second user on the third-party website, receiving first user and second user activity on the third-party website;
    identifying, with one or more processors, an interaction between the first user and the second user on the third-party website;
    determining, with the one or more processors, a context for the interaction between the first user and the second user on the third-party website;

identifying, with the one or more processors, a group that the first user created on the social network based on the context; and providing a suggestion that the first user add the second user to the group.

3. The method of claim 2, wherein the group is a second group and further comprising identifying a first group that the first user added the second user to on the social network.

4. The method of claim 2, wherein the social network is a first social network and the third-party website is a second social network.

5. The method of claim 2, wherein the context for the interaction on the third-party website is determined from a subject of the third-party website.

6. The method of claim 2, wherein the suggestion is sent via the social network and wherein the second user is automatically added to the group.

7. The method of claim 2, wherein the group is a first group and further comprising:
receiving acceptance of the suggestion that the first user add the second user to the group;
determining whether the second user has a second group with the context; and
responsive to the second user having a second group with the context, adding the first user to the second group.

8. The method of claim 2, further comprising:
determining whether the first user and the second user satisfy a threshold number of interactions on the third-party website.

9. The method of claim 2, wherein the interaction on the third-party website is at least one of an indication of approval of an action associated with the first user, a comment from the second user on an action performed by the first user and a reciprocal electronic message between the first and second users.

10. A system comprising:
one or more processors, the one or more processors being configured to:
register a first user and a second user by providing the first user and the second user with login credentials from a social network;
authenticate the first user and the second user on a third-party website using the login credentials based on communicating the social network and the third-party website through a snippet installed on the third-party website;
responsive to authenticating the first user and the second user on the third-party website, receive first user and second user activity on the third-party website;
identify an interaction between the first user and the second user on the third-party website;
determine a context for the interaction between the first user and the second user on the third-party website;
identify a group that the first user created on the social network based on the context; and
provide a suggestion that the first user add the second user to the group.

11. The system of claim 10, wherein the group is a second group and further comprising identifying a first group that the first user added the second user to on the social network.

12. The system of claim 10, wherein the social network is a first social network and the third-party website is a second social network.

13. The system of claim 10, wherein the context for the interaction on the third-party website is determined from a subject of the third-party website.

14. The system of claim 10, wherein the suggestion is sent via the social network and wherein the second user is automatically added to the group.

15. The system of claim 10, wherein the group is a first group and further comprising:
receiving acceptance of the suggestion that the first user add the second user to the group;
determining whether the second user has a second group with the context; and
responsive to the second user having a second group with the context, adding the first user to the second group.

16. The system of claim 10, further comprising:
determining whether the first user and the second user satisfy a threshold number of interactions on the third-party website.

17. The system of claim 10, wherein the interaction on the third-party website is at least one of an indication of approval of an action associated with the first user, a comment from the second user on an action performed by the first user and a reciprocal electronic message between the first and second users.

18. A computer program product comprising a non-transitory computer usable medium including a computer readable program, wherein the computer readable program when executed on a computer causes the computer to perform steps comprising:
registering, with one or more processors, a first user and a second user by providing the first user and the second user with login credentials from a social network;
authenticating the first user and the second user on a third-party website using the login credentials based on communicating the social network and the third-party website through a snippet installed on the third-party website;
responsive to authenticating the first user and the second user on the third-party website, receiving first user and second user activity on the third-party website;
identifying, with the one or more processors, an interaction between the first user and the second user on the third-party website;
determining, with the one or more processors, a context for the interaction between the first user and the second user on the third-party website;
identifying, with the one or more processors, a group that the first user created on the social network based on the context; and
providing a suggestion that the first user add the second user to the group.

19. The computer program product of claim 18, wherein the computer readable program when executed on a computer further causes the computer to perform steps comprising:
receiving acceptance of the suggestion that the first user add the second user to the group;
determining whether the second user has a second group with the context; and
responsive to the second user having a second group with the context, adding the first user to the second group.

20. The computer program product of claim 18, wherein the computer readable program when executed on a computer further causes the computer to perform steps comprising:
determining whether the first user and the second user satisfy a threshold number of interactions on the third-party website.

* * * * *